Jan. 16, 1968
R. L. HILL
3,363,894
DUAL SPRING RATE SHOCK STRUT
Filed July 9, 1965
2 Sheets-Sheet 1
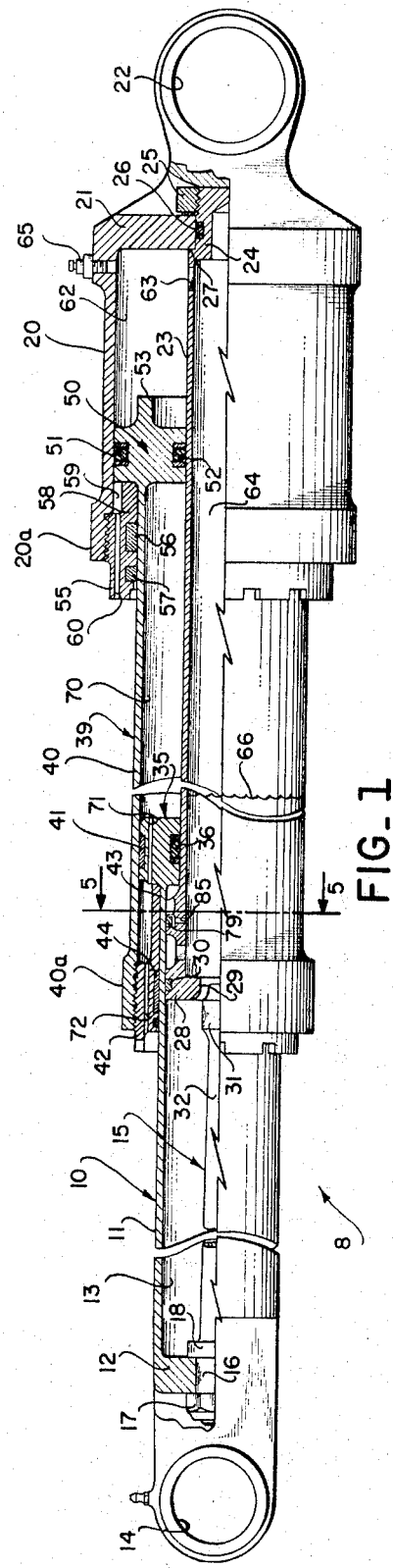
FIG_1
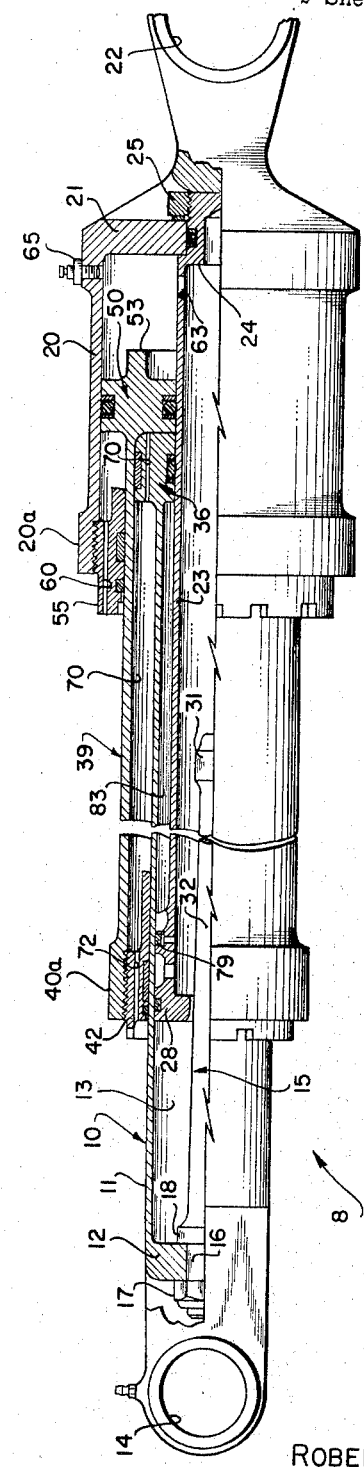
FIG_2
INVENTOR.
ROBERT L. HILL
BY
R. E. Granger
Attorney Jan. 16, 1968 R. L. HILL 3,363,894
DUAL SPRING RATE SHOCK STRUT
Filed July 9, 1965 2 Sheets-Sheet 2
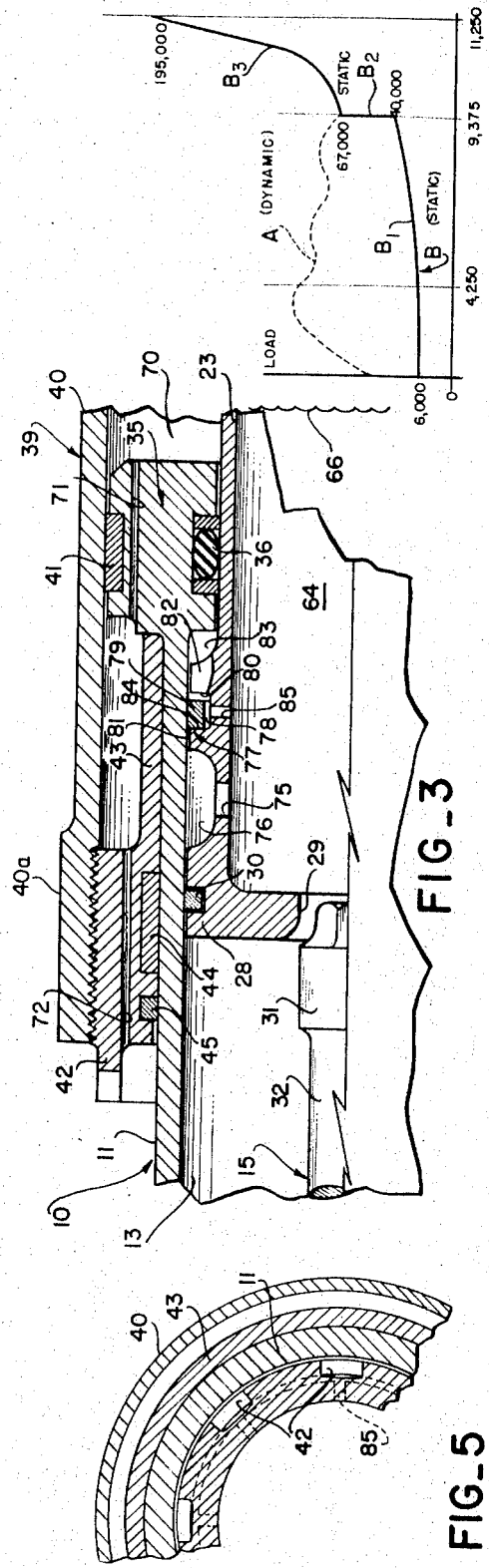
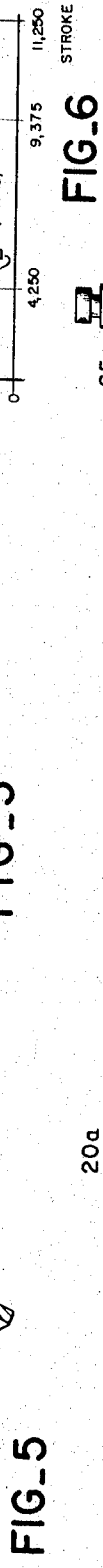
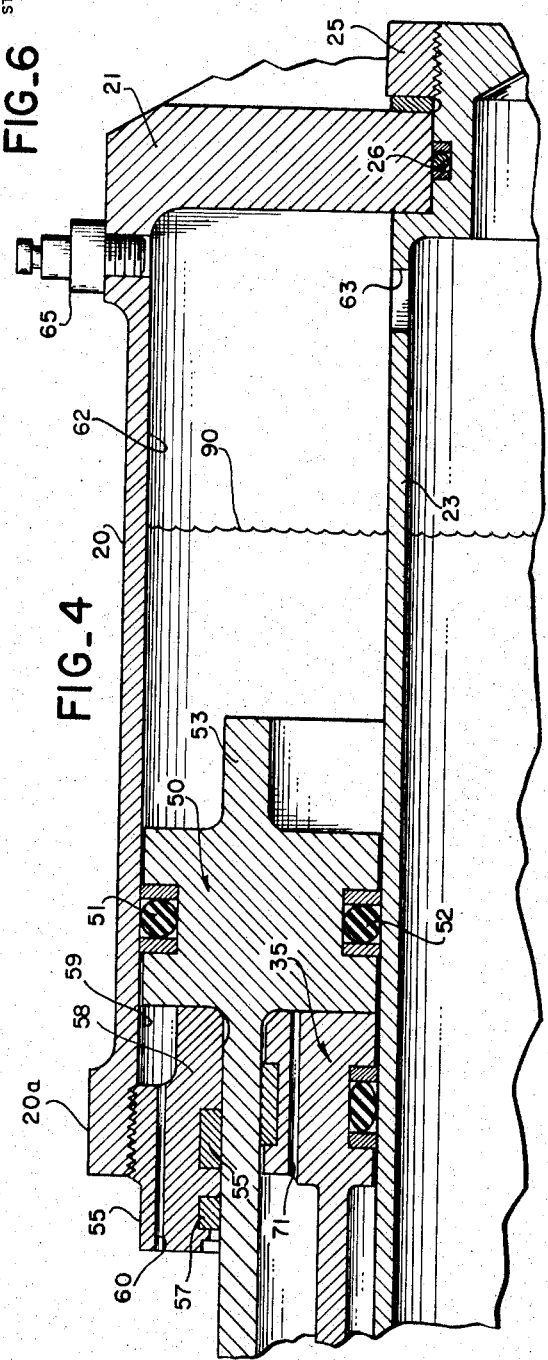
INVENTOR.
ROBERT L. HILL
BY
R. E. Geangue
Attorney United States Patent Office 3,363,894
Patented Jan. 16, 1968

3,363,894
DUAL SPRING RATE SHOCK STRUT
Robert L. Hill, Sepulveda, Calif., assignor to Menasco Manufacturing Company, Burbank, Calif., a corporation of California
Filed July 9, 1965, Ser. No. 470,742
8 Claims. (Cl. 267—65)

This invention relates to a dual spring rate shock strut and more particularly to a hydro pneumatic shock absorber for use as an aircraft strut to provide a substantially constant strut extension over a wide range of static loads of the aircraft.

In the design of aircraft, it is desirable to have interchangeability of parts for all modifications of the aircraft. In this connection, it is desirable to have a strut which will provide a substantially constant height of the aircraft from the ground regardless of variations in static load between the various modifications of the aircraft. At the same time, it is necessary to provide for a sufficient cylinder diameter to support the dynamic loads which are encountered upon landing and prevent an excessive stress developing on the strut. In U.S. Patent No. 2,563,518 to Fred N. Dickerman, there is disclosed a strut for tail and nose wheel installations which prevents the extension of the wheel under static loads beyond the position where it has favorable casting characteristics. However, the construction of this device is not suitable for a shock strut which carries a large portion of the load of the aircraft upon landing.

By the present invention, a primary piston and a secondary piston are utilized to obtain the dual spring rate, and these pistons are so arranged that an extension of the secondary piston acts as a bearing and guide for the primary piston and also as a stop for the primary piston at the location of maximum extension. The device includes an orifice support tube which provides an orifice for damping of the dynamic loading and the primary piston rides directly on the outside of the orifice tube. By this structure, a shock absorber or strut of maximum strength and minimum complexity is provided to take up major loads of the aircraft which develop on the main strut.

It is therefore an object of the present invention to provide a dual spring rate shock strut having primary and secondary pistons which support a wide range of static thrust with a minimum of change in stroke.

Another object of the present invention is to provide a dual spring rate shock strut in which a small change in static thrust results in a large stroke of a primary piston and in which damping is provided for the primary piston to permit the primary piston to take up dynamic loading during landing; the loading of the aircraft being normally carried by the secondary piston.

Another object of the invention is to provide a dual spring rate shock strut in which the primary piston rides on the outside diameter of an orifice support tube and in which the secondary piston serves as a bearing and a stop for the primary piston.

A further object of the subject invention is to provide a dual spring rate shock strut in which the displacement of the primary piston is accomplished by small change in static force when the aircraft is on the ground and in which the primary piston assumes the dynamic loading during landing; a large range of static loads being supported by the secondary piston with only slight displacement so that aircraft of different weights can utilize the same support strut.

Another object of the invention is to provide a dual spring rate shock strut which has maximum strength for a given size and which has minimum complexity.

These and other objects of the invention not specifically set forth above will become readily apparent from the accompanying description and drawings, in which:

FIGURE 1 is a side elevational view of the shock strut of the present invention, partly in section, with both the primary and secondary pistons extended;

FIGURE 2 is a side elevational view, partly in section, similar to FIGURE 1 with the primary piston fully compressed and with the secondary piston moved partially;

FIGURE 3 is an enlarged partial sectional view of the control ring for controlling flow to and from the orifice support tube;

FIGURE 4 is an enlarged partial sectional view of the secondary piston in its fully extended position;

FIGURE 5 is a transverse vertical section along 5—5 of FIGURE 1 showing the orifice holes; and FIGURE 6 is a load versus stroke curve for the strut.

Referring to the embodiment of the invention shown for purposes of illustration, the shock absorber 8 has a primary piston 10 consisting of a cylinder 11 closed by a piston head 12 to form a hydraulic fluid space 13. An attachment 14 at the outer end of cylinder 11 is provided for connection to aircraft structure which supports the wheel or wheels of the aircraft. A metering pin 15 has an end 16 which projects through an opening in the head 12 and the end is threaded to receive a nut 17 which pulls collar 18 tight against head 12 in order to support the metering pin centrally within the space 13.

A cylindrical housing 20 is closed by end 21 which mounts on attachment 22 for connecting the strut to the main aircraft structure. An orifice support tube 23 has a reduced threaded end 24 which projects through an opening in the end 21 and a nut 25 draws tube flange 27 against the end 21. A sealing ring 26 is located in end 24 and engages end 21. The other end of tube 23 has an enlarged partition 28 containing tapered orifice opening 29. A seal 30 is located in partition 28 and engages cylinder 11. The metering pin 15 has an enlarged end 31 which connects with surface 32 which tapers back to the collar 18 so that as the metering pin first passes through the opening 29, the opening is restricted by the end 31 and thereafter the opening enlarges and then gradually reduces as the primary piston 10 moves under the load of the aircraft.

The end of cylinder 11 consists of an enlarged ring 35 which rides on the outside diameter of orifice support tube 23 and contains a seal 36 engaging the outside diameter. The secondary piston 39 consists of a cylindrical extension 40 which surounds the ring 35. A nylon bearing 41 is carried by ring 35 so that the cylinder 40 serves as a bearing and guide for the primary piston 10. The open end 40a of the cylinder 40 is threaded to receive a fitting 42 which has an annular projection 43 extending into the cylinder to provide a stop which engages the ring 35 in the fully extended position of primary piston 10. Fitting 42 also surrounds the primary cylinder 11 and contains a nylon bearing 44 and a scrapper 45 which engage the outer diameter of the cylinder 11.

The opposite end of the secondary cylinder 40 carries secondary piston head 50 which contains an outer sealing ring 51 engaged with the inner surface of the housing 20 and carries an inner sealing ring 52 which engages the outer surface of the orifice support tube 23. Projection 53 extends from the end of the secondary piston head 50 and engages the end 21 of housing 20 in order to limit the inward movement of the piston head 50. The threaded open end 20a of the housing 20 receives a fitting 55 which contains nylon bearing 56 and a scrapper 57 surrounding the secondary piston 40. An annular ring 58 projects from the fitting 55 to provide a stop for engaging the head 50 and limiting its outward movement. A variable space 59 is located between the piston head 50 and the fitting 55 and is connected with atmosphere by means of passage 60 in fitting 55 so air in space 59 cannot interfere with the movement of the piston head 50 within the housing 20.

Space 62 between the secondary piston head 50 and the housing end 21 is charged with hydraulic fluid which communicates through opening 63 with the interior space 64 of the orifice support tube 23 and then flows through the orifice 29 to the interior space 13 within the primary cylinder 11. An air charging valve 65 is located to one side of the end 21 and the strut is charged with fluid to the level of the valve seat with both the primary and secondary pistons erect and in the fully compressed position (enlarged ring 35 bottomed against secondary piston head 50 and projection 53 bottomed against end 21). After the strut is charged with fluid while both the primary and secondary pistons are erect and in their extended position of FIGURE 1, the level of the fluid will be at the location of line 66 and the space behind the fluid is charged to the desired air pressure. The variable space 70 between the ring 35 and the secondary piston head 50 and within the cylindrical extension 40 is always connected to atmosphere through passage 71 in ring 35 and through passage 72 in fitting 42 so that air within the space 72 cannot resist the movement of ring 35 in the space 70.

When the wheels of the aircraft touch the ground upon landing, the primary piston 10 is forced inwardly causing hydraulic fluid to be forced from space 13 through the orifice 29 into the space 64 within the orifice support tube. This movement of the fluid provides dynamic damping and takes up the initial dynamic loading on the strut. The orifice support tube contains an opening 75 which connects the fluid in space 64 with space 76 located between the support 23 and cylinder 11. Also, the support tube has an enlarged annular ring 77 with an annular cutout 78 containing a moving ring 79 which is spaced outwardly from the inner surface of the cutout to provide a flow space therebetween. When the primary piston 10 moves into space 70, the cylinder 11 drags the ring 79 with it until it engages the edge 80 of the cutout 78. Fluid flows through the space 81 between the projection 77 and the cylinder 11 and then around the inner surface of ring 79 and through a plurality of slots 82 formed in the projection 77 into the space 83 between the ring 35 and the projection 77. Thus, as the cylinder 11 moves inwardly, hydraulic fluid flows from the space 64 into the enlarging space 83 to minimize the build up of pressure which would otherwise result in space 64. When the movement of the ring 35 is reversed, the space 83 is continually reduced and the cylinder 11 drags ring 79 toward edge 84 of the cutout 78 to close the space 81. Therefore, the oil will return to the space 64 through the slots 82, the cutout 78 and a return pasage 85 which is reduced in size to provide a rebound snubber orifice.

The strut 10 is shown in FIGURE 1 in its fully extended position wherein the ring 35 is abutted against the stop 43. This fully extended position exists when the strut has been placed in a downward position in preparation for landing. When the wheels touch the ground, the piston 10 will be moved forcing oil through orifice 29 into the space 64 within the orifice support tube 23. At the same time hydraulic fluid will flow through the passage 75, past the ring 79 and through the slots 82 into the space 83 which will continually expand as the ring 35 moves upwardly into the space 70. During the movement of the ring 35 and the cylinder 11, hydraulic damping will resist the dynamic load along the dashed curve A of FIGURE 6, until the aircraft assumes a stable condition wherein the dynamic loads are greatly reduced and the static loads are being carried by the secondary piston 50.

The solid line curve B of FIGURE 6 shows the relationship between static load and stroke, and while the aircraft is on the ground and taxiing, the static load curve B generally indicates the position of the strut. Because of the fact that the fluid can move through the orifice 29 into the space 83 behind the ring 35 as the primary piston 10 moves inwardly, a very flat portion $B_1$ of the static load curve is effective so that the complete stroke of the primary piston is accomplished with over a small change in static load. The vertical portion $B_2$ of the curve occurs when the static load is transferred to the secondary piston 39 by engagement of ring 35 with the secondary piston head 50. The steep rise in the curve along portion $B_3$ occurs when the piston head 50 moves into the housing 20. When the piston head 50 engages the stop 58, the hydraulic fluid within the strut will fill all of the space downward from the fluid line 90 while the space between this line and the end 21 will contain compressed air. During movement of the primary piston 10 and the secondary piston 39, the spaces 59 and 70 remain in communication with ambient pressure.

From the above explanation of FIGURE 6, it is apparent that a wide range in static load of an aircraft will fall along the static curve portion $B_2$ so that the strut of the present invention will be extended the same amount for various loadings and modifications for a single aircraft. This permits for the aircraft strut to be standardized for various modifications of the same aircraft since the length of the strut for static support will not vary significantly even if the static load should fall within the steep portion $B_3$ of curve $B_1$.

The structure of the shock strut of the present invention provides that the ring 35 of the primary piston 10 is guided by the outside diameter of the orifice support tube 23 and also by the cylindrical extension 40 of the secondary piston 39. Also, the fitting 42 on extension 40 serves as a stop for the primary piston 10. The orifice tube also serves as a guide for the secondary piston 39 since it extends through the piston head 50. Such structure provides maximum strength to the strut with a minimum of complexity. The effective static load carrying area of the strut is defined by the outer diameter of the orifice support tube 23 until the ring 35 bottoms on the piston head 50. Thereafter, the effective static load carrying area is that defined by the internal diameter of the housing 20. The effective dynamic load carrying area is defined by the inner diameter of the cylinder 11. When the cylinder 11 moves out of the unit, rebound snubbing is accomplished by the oil trapped in the chamber 83 which is metered through the orifice 85 while the ring 79 closes off the passageway around the cylinder projection 77. While the particular strut structure herein shown and described in detail is fully capable of obtaining the objects and providing the advantages hereinbefore stated, it is to be understood that it is merely illustrative of the present preferred embodiment of the invention and that no limitations are intended to the details of the construction or design herein shown other than as defined in the appended claims.

What is claimed is:

1. A dual spring rate shock strut comprising:
   a strut housing having a closed end and an open end;
   a secondary piston comprising a piston head slidable in said housing and an extension on said piston head projecting snugly through said open end of said housing for slidable support thereby;
   an orifice support tube rigidly connected with said closed end of said housing and projecting snugly through an opening in said piston head and into said extension in spaced relationship thereto;
   an orifice opening located at the end of said tube; and
   a primary piston comprising a cylinder having a closed end and an open end, said open end extending into the space between said extension and said orifice support tube and being guided thereby for movement of said open end into engagement with said piston head.

2. A dual spring rate shock strut as defined in claim 1 having stop means located in said open end of said housing for limiting the movement of said piston head out of said housing, said stop means snugly receiving said extension for slidably guiding said extension.

3. A dual spring rate shock strut as defined in claim 2 having a projection on said piston head extending from said piston head toward said closed end of said housing for limiting the movement of said piston head.

4. A dual spring rate shock strut as defined in claim 1 wherein said open end of said primary piston comprises an enlarged ring slidably engaging the interior surface of said extension and the outside surface of said orifice tube for guiding said cylinder.

5. A dual spring rate shock strut as defined in claim 4 including stop means supported in the open end of said extension to limit the movement of said primary piston away from said secondary piston.

6. A dual spring rate shock strut as defined in claim 5 wherein the orifice end of said support tube is enlarged, the variable space between said support tube and said cylinder defined by said enlarged end and said enlarged ring being in fluid communication with the interior of said support tube to receive and discharge fluid as said primary piston moves toward and away from said secondary piston.

7. A dual spring rate shock strut as defined in claim 4 having stop means located in said open end of said housing for limiting the movement of said piston head out of said housing, said stop means snugly receiving said extension for slidably guiding said extension.

8. A dual spring rate shock strut as defined in claim 1 having a metering pin secured to the closed end of said primary piston and moved through said orifice opening during movement of said primary piston.

References Cited

UNITED STATES PATENTS

| | | | |
|---|---|---|---|
| 2,227,261 | 12/1940 | Johnson | 267—64 |
| 2,679,827 | 6/1954 | Perdue | 267—64 |
| 2,891,788 | 6/1959 | Stoner | 244—104 |

FOREIGN PATENTS

| | | |
|---|---|---|
| 624,922 | 8/1961 | Canada. |

ARTHUR L. LA POINT, *Primary Examiner.*

R. M. WOHLFARTH, *Assistant Examiner.*